US012749881B2

(12) United States Patent
Genung et al.

(10) Patent No.: US 12,749,881 B2
(45) Date of Patent: Sep. 29, 2026

(54) ATTACHABLE CLOSURE DEVICE FOR SECURING COVERS TO POWER LINE FIXTURES AND HARDWARE

(71) Applicant: Custom Coating Innovations, Inc., Belleville, IL (US)

(72) Inventors: George Genung, St. Louis, MO (US); Matthew Hancock, Mascoutah, IL (US)

(73) Assignee: Custom Coating Innovations, Inc., Belleville, IL (US)

( * ) Notice: Subject to any disclaimer, the term of this patent is extended or adjusted under 35 U.S.C. 154(b) by 299 days.

(21) Appl. No.: 18/777,951

(22) Filed: Jul. 19, 2024

(65) Prior Publication Data

US 2025/0030230 A1 Jan. 23, 2025

Related U.S. Application Data

(60) Provisional application No. 63/514,399, filed on Jul. 19, 2023.

(51) Int. Cl.
*H02G 3/08* (2006.01)
*H02G 7/00* (2006.01)

(52) U.S. Cl.
CPC ............... *H02G 3/086* (2013.01); *H02G 7/00* (2013.01)

(58) Field of Classification Search
None
See application file for complete search history.

(56) References Cited

U.S. PATENT DOCUMENTS

| | | | | |
|---|---|---|---|---|
| 5,670,928 A * | 9/1997 | Cheng | H01H 85/202 | 361/833 |
| 6,170,685 B1 * | 1/2001 | Currier | H02G 3/121 | 220/6 |
| 11,744,364 B2 * | 9/2023 | Bastian | A47G 1/1613 | 248/298.1 |
| 12,057,688 B1 * | 8/2024 | Baldwin | H02G 3/083 | |
| 2013/0240695 A1 * | 9/2013 | Chaung | H05K 5/0204 | 248/220.22 |
| 2016/0120049 A1 * | 4/2016 | Chen | F16M 13/02 | 248/316.1 |
| 2016/0260560 A1 * | 9/2016 | Mishra | H01H 71/52 | |
| 2024/0363149 A1 * | 10/2024 | Lin | G11B 33/022 | |
| 2025/0316434 A1 * | 10/2025 | Genung | H01H 85/25 | |
| 2026/0161903 A1 * | 6/2026 | Mo | G06K 7/0078 | |

* cited by examiner

*Primary Examiner* — Krystal Robinson
(74) *Attorney, Agent, or Firm* — Sandberg Phoenix & von Gontard, P.C.

(57) ABSTRACT

An attachable closure device enables a housing to be positioned over a remote object, and then enables the housing to be closed over the remote object and locked in the close configuration to contain the object in the housing.

20 Claims, 5 Drawing Sheets

ATTACHABLE CLOSURE DEVICE FOR SECURING COVERS TO POWER LINE FIXTURES AND HARDWARE

RELATED APPLICATIONS

This patent application claims the benefit of the priority of the filing date of Provisional Patent Application Ser. No. 63/5,134,399, which was filed on Jul. 19, 2024.

BACKGROUND OF THE INVENTION

Protective devices are often used on components of electric power distribution systems exposed to the environment, for example power line fixtures and hardware to protect the components. These devices protect the components from damage resulting from contact with animals such as birds or contact with objects of the surrounding environment such as brush or tree branches. Protective devices of this type are installed on power lines, cross arms of utility towers, insulators, etc. to protect these components from the surrounding environment.

Many common components of electric power distribution systems are positioned remotely or high above the ground on utility poles or other similar structures. Remote positioning of these components makes them difficult to access for installation of protective devices on the components. The remote positioning often requires that protective devices be installed by a technician using an elongate pole or "hot stick". A hot stick is an insulated pole used in the electric power distribution industry by utility technicians performing live-line work on energized high voltage electric power lines. The hot stick protects the technician from electric shock. The technician manually holds and manipulates the hot stick at the proximal end of the hot stick while using the distal end of the hot stick to engage with and position a protective device on a component of the electric power distribution system. The technician then further manipulates the hot stick to secure the device to the component.

The current procedure for positioning protective devices on components of power distribution systems and securing the devices on the components is very difficult to perform using a hot stick and very time consuming.

SUMMARY OF THE INVENTION

The attachable closure device of this disclosure has a unique and non-obvious construction that enables the device to be easily and quickly positioned on a remote component of an electric power distribution system and then secured to the component.

The device is comprised of a cover or housing that is configured for containing a component of an electric power distribution system. The configuration of the housing enables the housing to be easily remotely positioned over and attached on the component to be protected.

A first panel is provided on the housing. The first panel extends from the housing to a position below the housing.

A second panel is provided on the housing adjacent to the first panel. The second panel also extends from the housing to a position below the housing.

The first panel and the second panel are connected to the housing to enable the first panel and the second panel to be moved toward each other to a closed position where the housing is closed over a component, and to enable the first panel and the second panel to be moved away from each other where the housing is opened and the first panel and the second panel are separated by a distance.

A clamp is attached by a movable connection to the device. The connection enables the clamp to be moved between an opened position and a closed position of the clamp relative to the first panel and the second panel.

In use of the device, the first panel and the second panel are initially set in their opened positions. With the first panel and the second panel in their opened positions, the device is configured to be remotely positioned above a component of a power distribution system to be protected by the device. The device can then be remotely positioned downwardly toward the component with the component passing upwardly between the opened first panel and second panel. The device is continued to be remotely moved downwardly until the component is positioned inside the housing of the device.

With the component to be protected positioned inside the housing of the device, the first panel and the second panel can be remotely moved toward each other to the closed positions of the first panel and the second panel. This encloses the component to be protected inside the housing.

With the first panel and the second panel in the closed positions, the clamp can then be remotely moved upwardly relative to the first panel and the second panel. This moves the clamp to the closed position of the clamp where the clamp engages over the opposite exterior surfaces of the first panel and the second panel. In this position of the clamp, the clamp locks the first panel and the second panel in their close positions and locks the component inside the housing.

BRIEF DESCRIPTION OF DRAWINGS

Further objects and features of the attachable closure device for securing covers to power line fixtures and hardware are set forth in the following detailed description and the drawings.

DETAILED DESCRIPTION OF THE INVENTION

Figure 1:
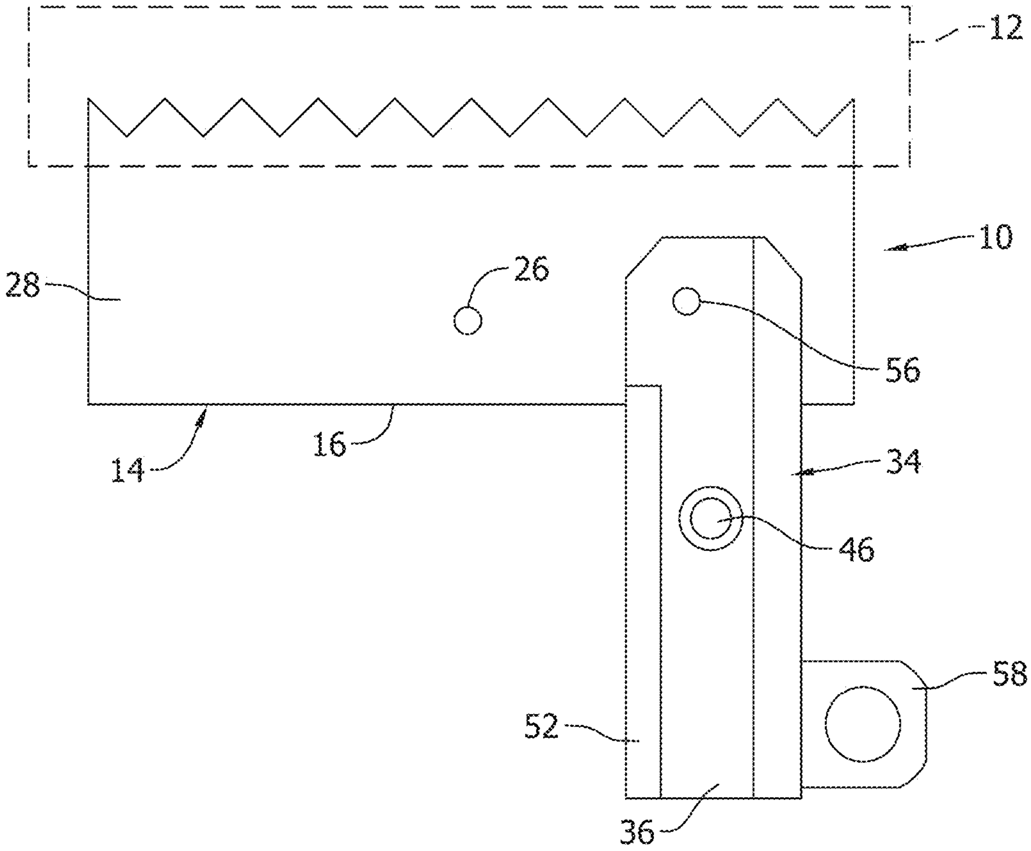
FIG. 1 is a representation of a side elevation view of a first side of the device of this disclosure in the opened configuration of the device.
Figure 2:
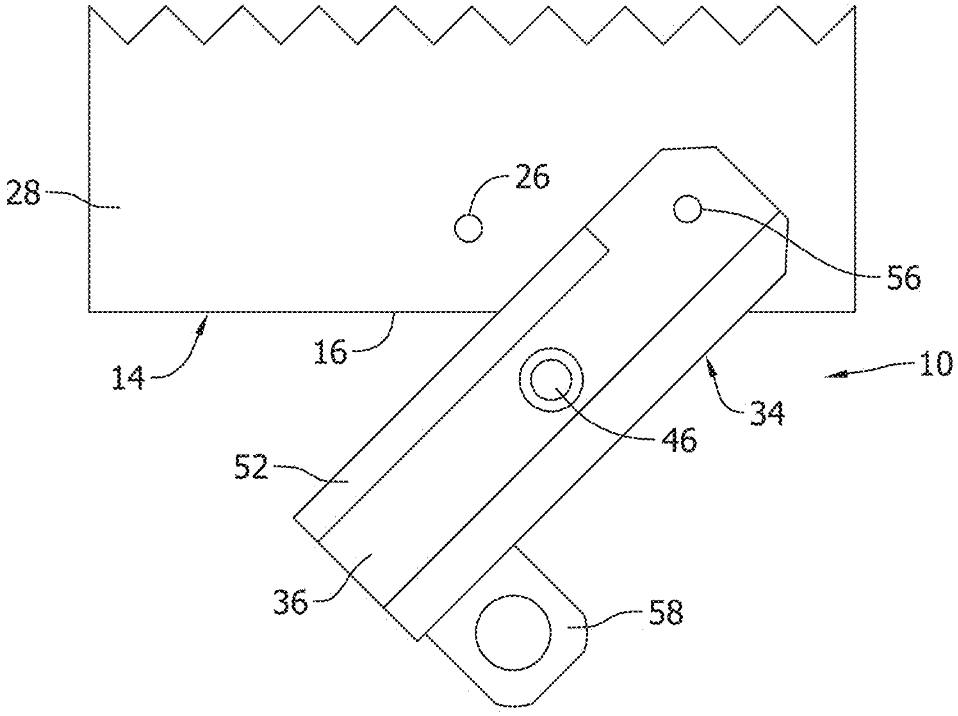
FIG. 2 is a representation of a side elevation view of the first side of the device as the clamp of the device is remotely operated to the closed position of the clamp.
Figure 3:
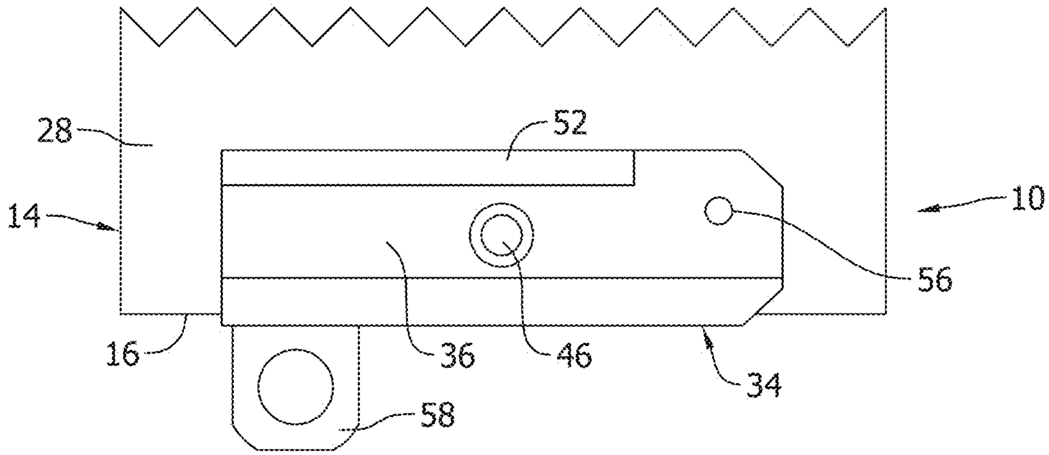
FIG. 3 is a representation of a side elevation view of the first side of the device in the closed position of the clamp.
Figure 4:
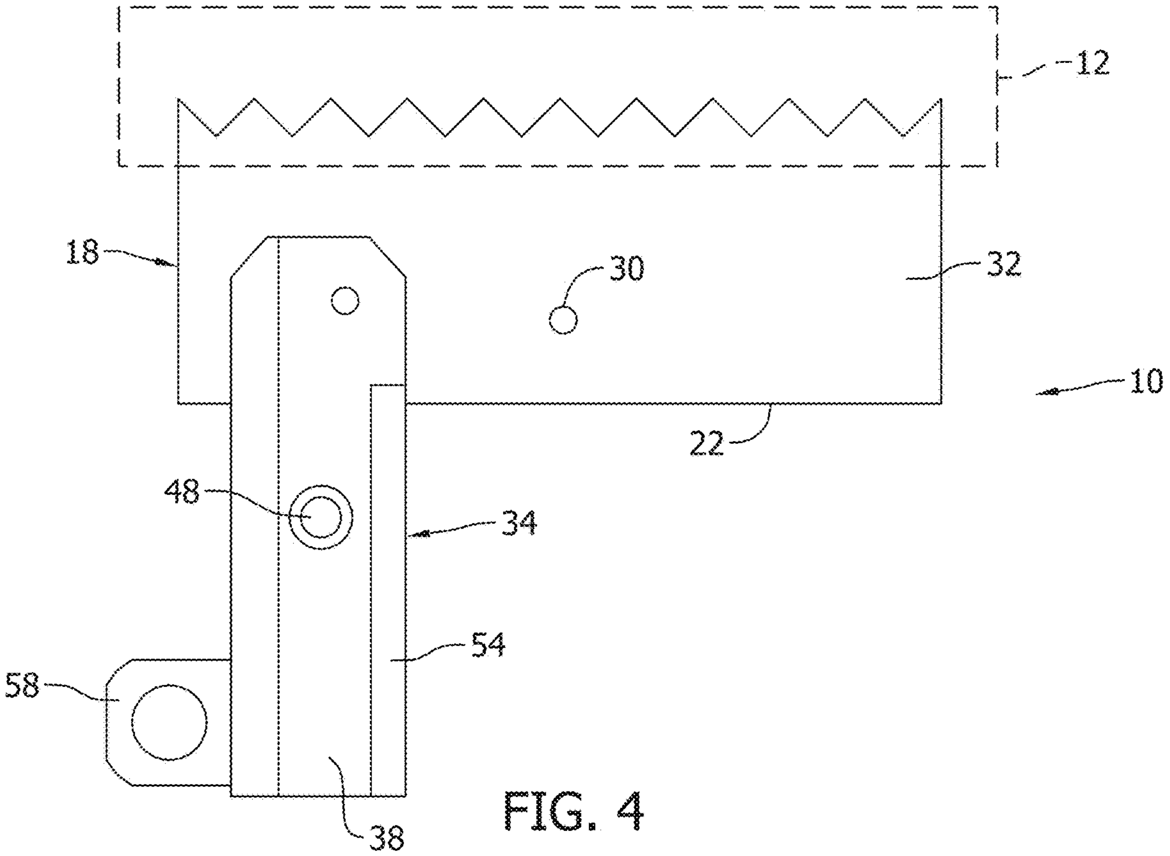
FIG. 4 as a representation of a side elevation view of the opposite side of the device of FIG. 1.
Figure 5:
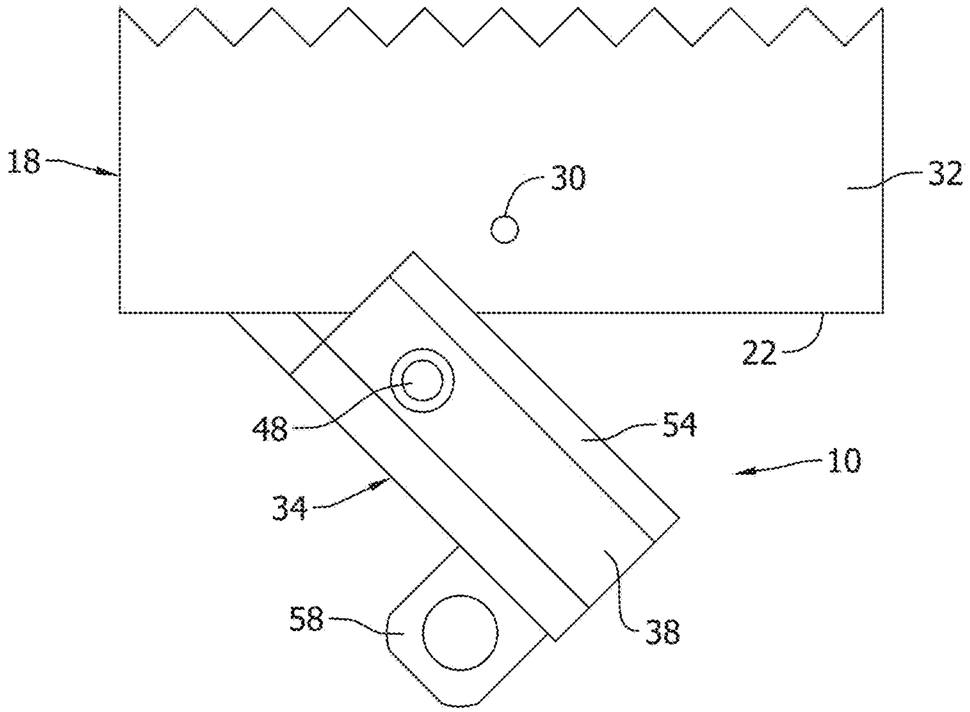
FIG. 5 is a representation of a side elevation view of the opposite side of the device of FIG. 2.
Figure 6:
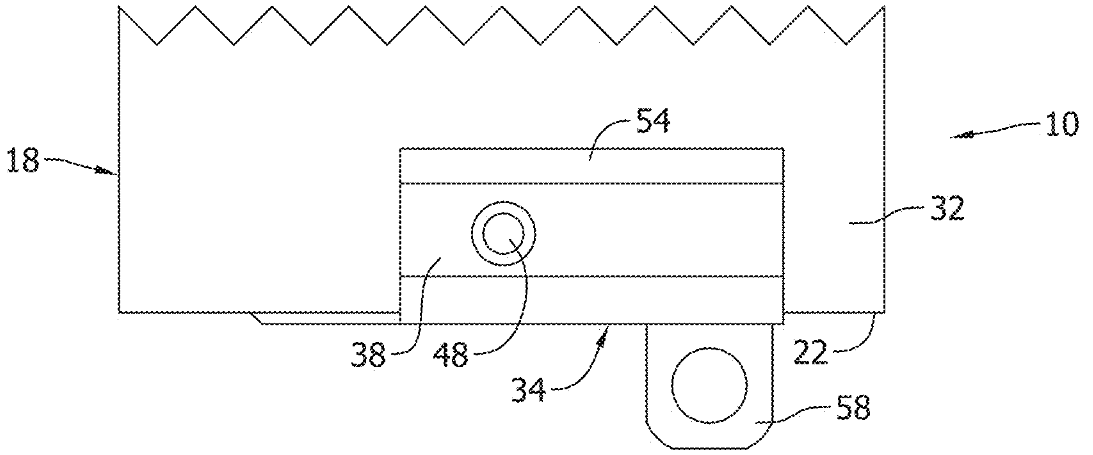
FIG. 6 is a representation of a side elevation view of the opposite side of a device of FIG. 3.
Figure 7:
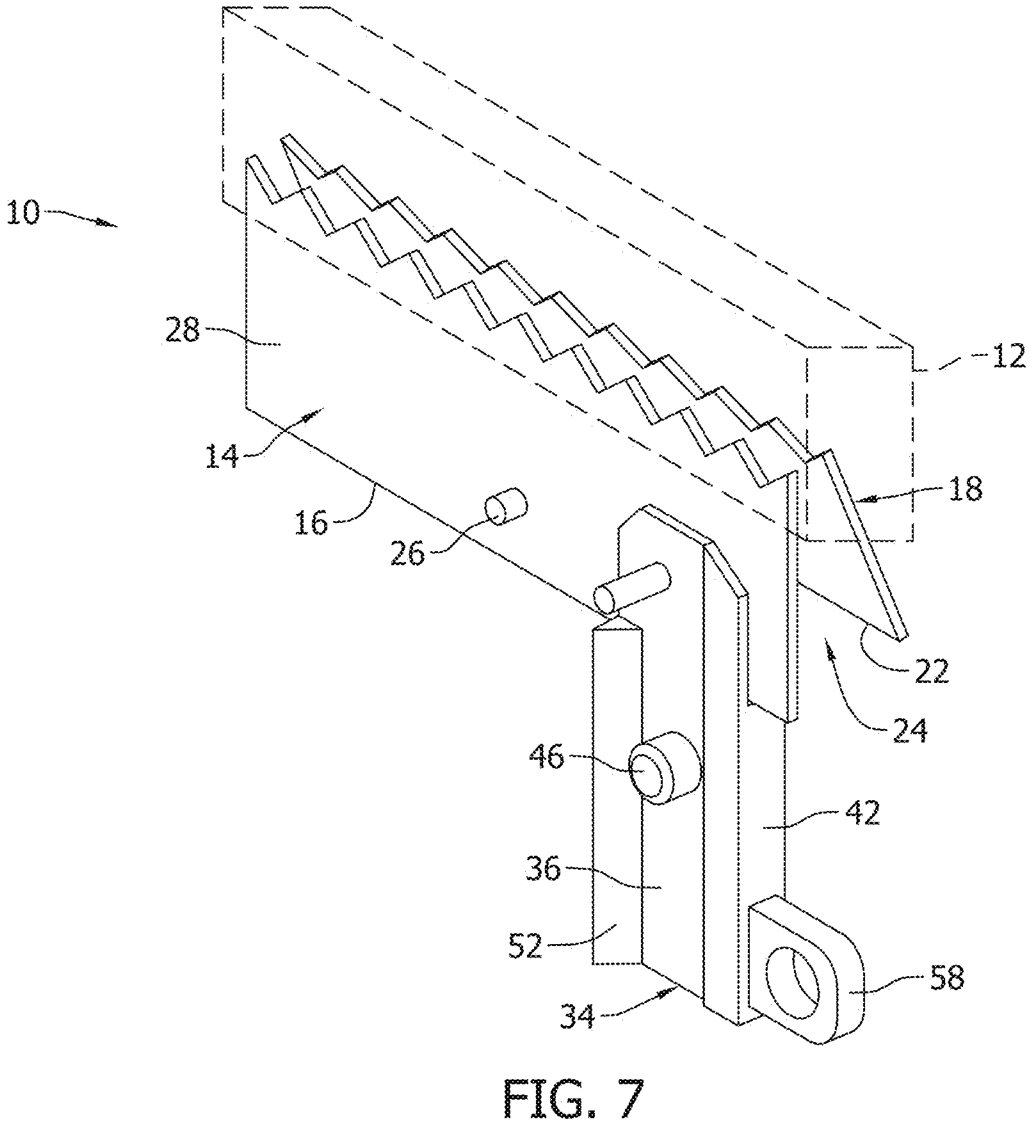
FIG. 7 is a representation of a perspective view of the device of FIG. 1.

FIG. 1 is a representation of a first side elevation view of the device 10 of this disclosure. FIG. 4 is a representation of the opposite side of the device 10 of FIG. 1, and FIG. 7 is a perspective view of the device 10 of FIG. 1. The features and component parts of the device 10 to be described herein are constructed of a material that provides the device with a sufficient structural strength to enable the device to function in the manner to be described. Additionally, the material of the device has heat resistant and flame resistant properties. The device could be constructed of other equivalent types of materials.

The attachable closure device 10 of this disclosure has a unique and non-obvious construction that enables the device to be positioned remotely on a component of an electric power distribution system by using a tool such as a hot stick, and then remotely secured to the component using the hot stick.

The device 10 is comprised of a cover or housing 12 that is configured for containing a component of an electric power distribution system. The housing 12 is represented in dash lines in FIGS. 1, 4 and 7. The dashed lines represent that the housing can have any one of a variety of different configurations that enable the housing to be positioned on and contain a remote object or component of an electric power distribution system. For example, if the object or component to be protected is an insulator, the housing 12 would be configured with a shape having an interior volume specifically dimensioned and configured to receive the insulator in the interior volume. In this example, the housing 12 could be constructed of two parts that are connected together by a hinged or pivoting connection. The pivoting connection would enable the two parts of the housing to be pivoted away from each other to open the housing a sufficient amount to enable the housing to be positioned over the insulator, and then the pivoting connection would enable the two parts of the housing to be pivoted toward each other to close the housing around the insulator and thereby protect the insulator in the interior volume of the housing. In other examples the component protected by the housing 12 could be a fuse, a switch, a portion of a power line or any other component that could be protected by being enclosed in a protective housing. In each case the housing 12 would have the basic configuration of the component being protected by the housing.

A first panel 14 is provided on the housing 12. The first panel 14 could be an integral part of the first part of a two-part housing. The first panel 14 is represented as having a general rectangular configuration and extends from the housing 12 to a distal edge 16 of the first panel that, in use, is positioned below the housing. The first panel 14 could have various configurations other than the rectangular configuration represented.

A second panel 18 is provided on the housing 12. The second panel 18 could be an integral part of a second part of a two-part housing. The second panel 18 is represented as having a general rectangular configuration and extends from the housing 12 to a distal edge 22 of the second panel that, in use, is positioned below the housing 12. The second panel 18 could have various configurations other than the rectangular configuration represented.

The first panel 14 and the second panel 18 are connected to the housing 12 as integral parts of the housing that are moved when the parts of the housing are moved. For example, in the earlier discussed two-part housing, the first panel 14 and the second panel 18 are moved in response to the first part and the second part of the housing being moved. If the first part and the second part of the housing are connected by a hinged or pivoting connection that enables the first part and the second part of the housing to be moved between opened and closed relative positions, the first panel 14 and the second panel 18 are also then movable between opened and closed relative positions.

FIG. 7 is a representation of the first panel 14 and the second panel 18 in the opened relative positions where the first panel 14 and the second panel 18 are spaced from each other by a distance 24. The distance 24 is sufficiently large to enable a component of a power distribution system to be inserted upwardly between the first panel 14 and the second panel 18 and into the interior volume of the housing 12 above the first panel 14 and the second panel 18. In one of the earlier discussed examples, the distance 24 is sufficiently large to enable an insulator of a power distribution system to be inserted upwardly between the first panel 14 and the second panel 18 and into the interior volume of the housing 12 above the first panel 14 and the second panel 18.

FIGS. 2, 3, 5, 6, 8 and 9 are representations of the first panel 14 and the second panel 18 in the closed relative positions where the first panel 14 and the second panel 18 are positioned adjacent to each other or side by side. In the closed positions the first panel 14 and the second panel 18 engage with each other and enclose the component of the power distribution system inside the housing 12.

A first pin 26 extends from the first panel 14 on an exterior surface 28 of the first panel. A second pin 30 extends from the second panel 18 on an exterior surface 32 of the second panel. The first pin 26 and the second pin 30 are coaxial and positioned on opposite sides of the closure device 10.

A clamp 34 is attached by a pivoting connection to the first panel 14. The clamp 34 is comprised of a first flange or panel 36 having a planar configuration and a second flange or panel 38 having a planar configuration. The first flange 36 and the second flange 38 are parallel and positioned side by side with a spacing between the flanges. The first flange 36 and the second flange 38 are connected along bottom edges of the flanges by a bottom plate 42. The bottom plate 42 extends along portions of the bottom edges of the first flange 36 and the second flange 38 and connects the flanges together in their spaced relationship. The bottom plate 42 separates the first flange 36 and the second flange 38 by a sufficient distance to enable the first flange 36 to be positioned over the exterior surface 28 of the first panel 14 and enable the second flange 38 to be positioned over the exterior surface 32 of the second panel 18 when the first panel 14 and the second panel 18 are in their closed positions and the clamp 34 is moved to the closed position relative to the first panel 14 and the second panel 18 represented in FIGS. 3, 6, 8 and 9.

A first cylinder 46 extends outwardly from the exterior surface of the first flange 36 of the clamp 34. The first cylinder 46 is hollow and contains a first socket (not shown) that is dimensioned to receive the first pin 26 in the first socket when the clamp 34 is moved to the closed position. The receipt of the first pin 26 in the socket of the first cylinder 46 releasably holds the clamp 34 in the closed position relative to the first panel 14 and the second panel 18. A second cylinder 48 extends outwardly from the exterior surface of the second flange 38 of the clamp 34. The second cylinder 48 is also hollow and contains a second socket (not shown) that is dimensioned to receive the second pin 30 in the second socket of the second cylinder 48 when the clamp 34 is moved to the closed position. The receipt of the second pin 30 in the socket of the second cylinder 48 releasably holds the clamp 34 in the closed position relative to the first panel 14 and the second panel 18.

Figure 8:
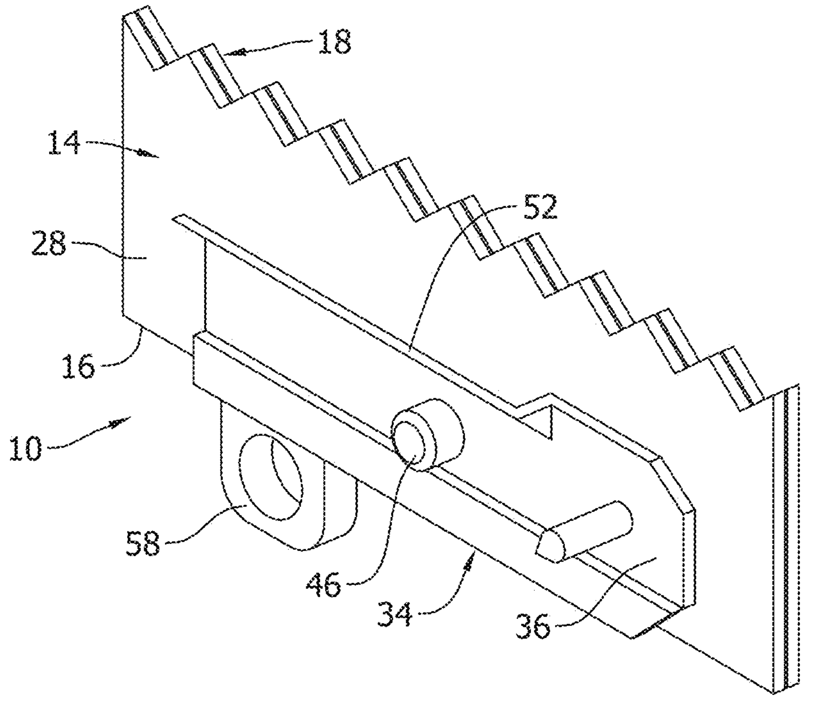
FIG. 8 is a representation of a perspective view of the device of FIG. 3.
Figure 9:
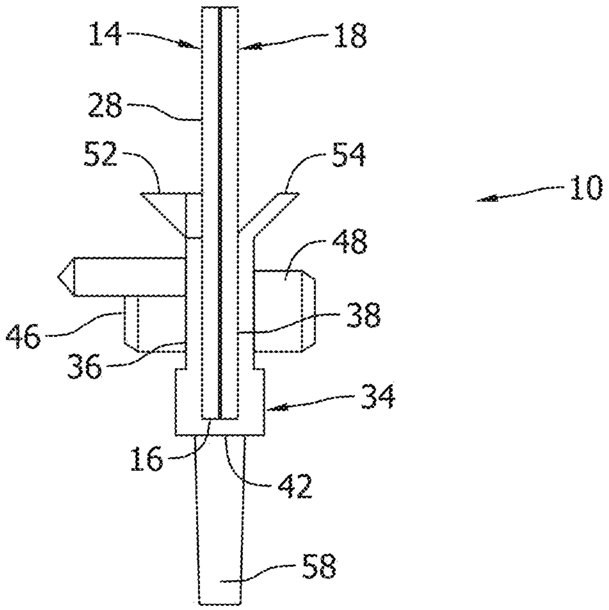
FIG. 9 is a representation of an end elevation view of the device of FIG. 3.

A first angled or inclined ridge 52 extends along a top edge of the first flange 36 opposite the bottom plate 42. As represented in FIGS. 7, 8 and 9, the first ridge 52 defines a planar surface that angles outwardly away from the first flange 36 and outwardly away from the spacing between the first flange 36 and the second flange 38. A second angled or inclined ridge 54 extends along the top edge of the second flange 38 opposite the bottom plate 42. As represented in FIG. 9, the second ridge 54 defines a planar surface that angles outwardly away from the second flange 38 and outwardly away from the spacing between the first flange 36 and the second flange 38. Together the first ridge 52 and the second ridge 54 work together to engage against and direct the first panel 14 and the second panel 18 into the spacing between the first flange 36 and the second flange 38 when moving the clamp 34 to the closed position relative to the first panel 14 and the second panel 18 represented in FIGS. 3, 6, 8 and 9.

A pivot connection 56 connects the first flange 36 to the exterior surface 28 of the first panel 14. The pivot connection 56 enables the clamp 34 to be moved between an opened position represented in FIGS. 1, 4 and 7 and a closed position represented in FIGS. 3, 6, 8 and 9 of the clamp 34 relative to the first panel 14 and the second panel 18.

A tab 58 projects from the bottom plate 42 of the clamp 34. The tab 58 projecting from the bottom plate 42 positions the tab 58 to be easily engageable by a tool such as a hot stick for moving the clamp 34 with the hot stick.

In the opened position of the clamp 34, the clamp 34 is suspended hanging downwardly from the first panel 14 below the distal edge 16 of the first panel as represented in FIGS. 1, 4 and 7. In the opened position of a clamp 34, the first panel 14 and the second panel 18 can be moved to their opened positions represented in FIG. 7 enabling a component of a power distribution system to be moved upwardly between the first panel 14 and the second panel 18 and into the housing 12. The first panel 14 and the second panel 18 can then be moved to their closed positions enclosing the component in the interior volume of the housing 12.

With the component positioned inside the housing 12, the clamp 34 can then be pivoted about the pivot connection 56 to the closed position. With the first panel 14 and the second panel 18 positioned in their closed position adjacent to each other and side by side as represented in FIGS. 8 and 9, moving the clamp 34 upwardly to the closed position results in the first flange 36 being moved over the exterior surface 28 of the first panel 14 and results in the second flange 38 being moved over the exterior surface 32 of the second panel 18. As the clamp 34 is moved to the closed position, the first ridge 52 engages with and passes over the first pin 26 and the second ridge 54 engages with and passes over the second pin 30. The clamp 34 is continued to be moved upward to the closed position until the first pin 26 aligns with and extends into the socket inside the first cylinder 46 and the second pin 30 aligns with and extends into the socket in the second cylinder 48. In this manner, the clamp 34 is moved to the closed position and the device 10 closes and locks the housing 12 with the component positioned inside the interior volume of the housing.

As various modifications could be made in the construction of the attachable closure device for securing covers to power line fixtures and hardware and its method of operation herein described and illustrated without departing from the scope of the invention, it is intended that all matter contained in the foregoing description and shown in the accompanying drawings shall be interpreted as illustrative only rather than limiting. Thus, the breadth and scope of the present disclosure should not be limited by any of the above described exemplary embodiments, but should be defined only in accordance with the following claims appended hereto and their equivalents.

The invention claimed is:

1. An attachable closure device comprising: a housing, the housing being adapted and configured for receiving and containing a component that is separate from the closure device to protect the component inside the housing; a first panel extending from the housing; a second panel extending from the housing; the first panel and the second panel being movable between opened positions with a spacing between the first panel and the second panel and closed positions with the first panel and the second panel being adjacent; and a clamp, the clamp being adapted and configured to be movable relative to the first panel and the second panel between an opened position and a closed position, where with the clamp in the opened position the first panel and the second panel are movable between the open positions and the closed positions of the first panel and second panel and with the clamp in the closed position the clamp engages over the first panel and the second panel thereby holding the first panel and the second panel adjacent.

2. The closure device of claim 1, further comprising: the clamp is connected by a pivot connection to the first panel, the pivot connection is adapted and configured to enable the clamp to be moved from the opened position of the clamp to the closed position of the clamp.

3. The closure device of claim 2, further comprising:

a tab projecting from the clamp, the tab being adapted and configured for engagement by a separate tool to move the tab by the separate tool and thereby move the clamp between the opened and closed positions of the clamp.

4. The closure device of claim 2, further comprising:

a pin on the first panel;

a socket on the clamp, the socket being adapted and configured to receive the pin in the socket when the clamp is moved to the closed position whereby the pin received in the socket holds the clamp in the closed position.

5. The closure device of claim 2, further comprising: a first flange on the clamp; a second flange on the clamp; and the first flange and the second flange being positioned on the clamp whereby when the clamp is moved to the closed position the first flange engages over the first panel and the second flange engages over the second panel holding the first panel and the second panel adjacent.

6. The closure device of claim 5, further comprising:

the first panel and the second panel are adjacent and positioned between the first flange and the second flange of the clamp in the closed position of the clamp.

7. The closure device of claim 5, further comprising:

a bottom plate on the clamp, the bottom plate connecting the first flange and the second flange with a spacing between the first flange and the second flange; and a tab projecting from the bottom plate, the tab being adapted and configured for engagement by a separate tool to move the tab by the separate tool and thereby move the clamp between the opened and closed positions of the clamp.

8. An attachable closure device comprising: a housing, the housing being adapted and configured for receiving and containing a component that is separate from the closure device to protect the component inside the housing, the housing being movable between the housing being opened and the housing being closed; a first panel extending from the housing; a second panel extending from the housing; the first panel and the second panel being movable between opened positions with a spacing between the first panel and the second panel and the housing being opened enabling a separate component to be moved through the spacing between the first panel and the second panel and into the housing, and closed positions with the first panel and the second panel being adjacent and the housing being closed; and a clamp on the first panel, the clamp being adapted and configured to be movable on the first panel between an opened position and a closed position, where with the clamp in the opened position the first panel and the second panel are movable between the open positions and the closed positions of the first panel and second panel, and with the first panel and the second panel in the closed positions and the clamp moved to the closed position the clamp engages over the first panel and the second panel thereby holding the first panel and the second panel adjacent.

9. The closure device of claim 8, further comprising:

the clamp is connected by a pivot connection to the first panel, the pivot connection is adapted and configured to enable the clamp to be moved from the opened position of the clamp to the closed position of the clamp.

10. The closure device of claim 8, further comprising:

a tab projecting from the clamp, the tab being adapted and configured for engagement by a separate tool to move the tab by the separate tool and thereby move the clamp between the opened and closed positions of the clamp.

11. The closure device of claim 8, further comprising:

a pin on the first panel;

a socket on the clamp, the socket being adapted and configured to receive the pin in the socket when the clamp is moved to the closed position whereby the pin received in the socket holds the clamp in the closed position.

12. The closure device of claim 8, further comprising: a first flange on the clamp; a second flange on the clamp; and the first flange and the second flange being relatively positioned on the clamp whereby when the clamp is moved to the closed position the first flange engages over the first panel and the second flange engages over the second panel holding the first panel and the second panel adjacent.

13. The closure device of claim 12, further comprising:

a bottom plate on the clamp, the bottom plate connecting the first flange and the second flange with a spacing between the first flange and the second flange; and a tab projecting from the bottom plate, the tab being adapted and configured for engagement to manually move the clamp between the opened and closed positions of the clamp.

14. The closure device of claim 12, further comprising:

a bottom plate on the clamp, the bottom plate connecting the first flange and the second flange with a spacing between the first flange and the second flange; and a tab projecting from the bottom plate, the tab being adapted and configured for engagement by a separate tool to move the tab by the separate tool and thereby move the clamp between the opened and closed positions of the clamp.

15. The closure device of claim 12, further comprising:

the first panel and the second panel are adjacent and positioned between the first flange and the second flange of the clamp in the closed position of the clamp.

16. A method of attaching a closure device over a separate component comprising:

opening a housing of the closure device by moving a first panel and a second panel of the housing to opened positions with a spacing between the first panel and the second panel;

inserting the separate component into the housing through the spacing between the first panel and the second panel;

moving the first panel and the second panel to closed positions and thereby closing the housing with the first panel and the second panel being adjacent;

holding the first panel and the second panel adjacent by moving a clamp relative to the first panel and the second panel, the clamp being movable relative to the first panel and the second panel between an opened position of the clamp and a closed position of the clamp, where with the clamp in the opened position the first panel and the second panel are movable between the open positions and the closed positions of the first panel and second panel and with the clamp in the closed position the clamp engages over the first panel and the second panel and thereby holds the first panel and the second panel adjacent.

17. The method of claim 16, further comprising:

moving the clamp on the first panel by pivoting the clamp about a pivot connection between the clamp and the first panel.

18. The method of claim 16, further comprising:

holding the clamp in the closed position by engaging a pin on the first panel in a socket on the clamp.

19. The method of claim 16, further comprising:

moving the clamp remotely by engaging the clamp with a tool that is separate from the closure device.

20. The method of claim 17, further comprising:

moving the first panel and the second panel remotely by engaging the first panel and the second panel with a tool that is separate from the closure device.

* * * * *